US012008980B2

(12) United States Patent
Ritter

(10) Patent No.: US 12,008,980 B2
(45) Date of Patent: Jun. 11, 2024

(54) GUITAR CASE

(71) Applicant: Wolfgang Ritter, Shenton Park (AU)

(72) Inventor: Wolfgang Ritter, Shenton Park (AU)

( * ) Notice: Subject to any disclaimer, the term of this patent is extended or adjusted under 35 U.S.C. 154(b) by 120 days.

(21) Appl. No.: 17/420,973

(22) PCT Filed: Jan. 6, 2020

(86) PCT No.: PCT/AU2020/050001
§ 371 (c)(1),
(2) Date: Jul. 6, 2021

(87) PCT Pub. No.: WO2020/142805
PCT Pub. Date: Jul. 16, 2020

(65) Prior Publication Data

US 2022/0101818 A1 Mar. 31, 2022

(30) Foreign Application Priority Data

Jan. 8, 2019 (AU) ................................ 2019900054

(51) Int. Cl.
*G10G 7/00* (2006.01)
*G10G 5/00* (2006.01)

(52) U.S. Cl.
CPC ............... *G10G 7/005* (2013.01); *G10G 5/00* (2013.01)

(58) Field of Classification Search
CPC ................................ G10G 5/00; G10G 7/005
USPC ........................................................ 206/314
See application file for complete search history.

(56) References Cited

U.S. PATENT DOCUMENTS 4,846,340 A * 7/1989 Walther ................... A45C 5/02 206/592
5,219,075 A * 6/1993 White .................... G10G 7/005 190/125
5,345,633 A * 9/1994 Harnish ................ B60N 2/879 5/639
5,833,051 A * 11/1998 Tiefenbrun ........... G10G 7/005 206/522

(Continued)

FOREIGN PATENT DOCUMENTS

KR 2003-0999176 Y1 10/2005

OTHER PUBLICATIONS

International Search Report for International Application No. PCT/AU2020/050001, dated Mar. 11, 2020, 4 pages.

(Continued)

*Primary Examiner* — Ernesto A Grano
(74) *Attorney, Agent, or Firm* — TraskBritt

(57) ABSTRACT

A guitar case comprising a resiliently flexible first teardrop oval shell defining a guitar receptacle for operatively receiving a guitar, the first shell including a guitar suspension arrangement comprising a body strap configured to operatively secure a body of the guitar away from a side of the receptacle, and a neck strap configured to operatively secure a neck of the guitar within the receptacle. Case 10 also includes a resiliently flexible second teardrop oval shell configured to operatively complementarily engage the first shell in a clamshell manner, and fastening means configured to fasten the shells together such that at least the upper shell elastically deforms over the guitar receptacle to sandwich the guitar suspended within the receptacle between the shells.

14 Claims, 5 Drawing Sheets

(56) References Cited

U.S. PATENT DOCUMENTS

| | | | | |
|---|---|---|---|---|
| 6,029,804 | A * | 2/2000 | Flynn | G10G 7/005 206/204 |
| 6,283,287 | B1 * | 9/2001 | Carl | G10G 7/005 190/102 |
| 6,499,592 | B2 * | 12/2002 | Wilfer | G10G 7/005 190/102 |
| 6,670,536 | B2 * | 12/2003 | Godin | G10G 7/005 84/453 |
| 6,951,280 | B1 * | 10/2005 | Lee | A45C 9/00 206/14 |
| 7,687,701 | B1 * | 3/2010 | Kushner | G10G 7/005 84/453 |
| 7,872,187 | B1 * | 1/2011 | Kushner | G10G 7/005 84/453 |
| 8,978,884 | B1 * | 3/2015 | Kushner | G10G 7/005 206/314 |
| 9,183,816 | B2 * | 11/2015 | Brawley | G10D 7/00 |
| 9,251,772 | B2 * | 2/2016 | Hungate | B65D 25/22 |
| D758,713 | S * | 6/2016 | Bailey, II | D3/204 |
| 9,858,906 | B2 * | 1/2018 | Visesnut | G10G 5/00 |
| 10,121,459 | B2 * | 11/2018 | Steinhauser | G10G 7/005 |
| D851,914 | S * | 6/2019 | Meikle | D3/204 |
| D888,409 | S * | 6/2020 | Baldemor | D3/204 |
| 2006/0027472 | A1 * | 2/2006 | Gokcen | B65D 81/02 206/522 |
| 2006/0086637 | A1 * | 4/2006 | Chen | B65D 81/2015 206/524.8 |

OTHER PUBLICATIONS

International Written Opinion for International Application No. PCT/AU2020/050001, dated Mar. 11, 2020, 4 pages.

* cited by examiner

GUITAR CASE

CROSS-REFERENCE TO RELATED APPLICATIONS

This application is a national phase entry under 35 U.S.C. § 371 of International Patent Application PCT/AU2020/050001, filed Jan. 6, 2020, designating the United States of America and published as International Patent Publication WO 2020/142805 A1 on Jul. 16, 2020, which claims the benefit under Article 8 of the Patent Cooperation Treaty to Australian Patent Application Serial No. 2019900054, filed Jan. 8, 2019.

TECHNICAL FIELD

This disclosure relates broadly to the field of musical instruments, in general, and more specifically, to a guitar case.

BACKGROUND

The following discussion of the background art is intended to facilitate an understanding of the present disclosure only. The discussion is not an acknowledgement or admission that any of the material referred to is or was part of the common general knowledge as at the priority date of the disclosure.

Guitars are a popular musical instrument, played by many people around the world. Given such widespread popularity, people often travel with guitars to music events, to social occasions, or the like. However, many guitars are not easy to transport. Being a sensitive musical instrument, guitars are generally easily damaged, often necessitating careful packing or storing for transport.

As a result, a wide variety of guitar cases have been developed over the years. However, with conventional guitar cases, size and bulk are often directly proportional to the level of protection provided, i.e., larger and more cumbersome guitar cases may provide better protection to a guitar transported therein, but at the expense of ease-of-movement and handling. In addition, given the inherent social nature of making music, conventional guitar cases are usually not very stylish, but rather very functional.

An example of such conventional guitar cases is shown in U.S. Pat. No. 6,283,287 B 1 to Carl, which shows a typical clamshell hardcase having two hinged hard shells forming a carrying case. While providing good protection to a guitar, a hardcase like this is bulky and cumbersome and often heavy to carry, as it takes a design approach of scaling well-known hard briefcase designs into a carry case for a guitar.

A need in the art for a guitar case able to offer good protection to a guitar transported therein has been identified, while also having a more stylish design and being more easily portable than conventional guitar cases. The current disclosure was conceived with the intent in mind of ameliorating the shortcomings in the art of conventional guitar cases.

BRIEF SUMMARY

The skilled addressee is to appreciate that reference herein to a guitar includes reference in general to any suitable chordophone or musical instrument that is transportable in the below-described guitar case. The suitability of the guitar case described herein to such a musical instrument will be readily apparent to the person skilled in the art.

According to an aspect of the disclosure there is provided a guitar case comprising:

- a resiliently flexible first shell having a guitar suspension arrangement defining a guitar receptacle for receiving a guitar, the guitar suspension arrangement comprising body and neck straps configured to secure the guitar within the receptacle such that a buffer zone is defined about the guitar;
- a resiliently flexible second shell configured to complementarily engage the first shell in a clamshell manner; and
- fastening means configured to fasten the shells together such that at least one shell elastically deforms over the receptacle to sandwich the guitar suspended within the buffer zone of the receptacle between the shells.

Typically, a Young's modulus for a material comprising the first and second shells is selected such that elastic deformation of the shells due to external compressive loads on the guitar case extends only into the buffer zone without reaching the guitar.

Typically, the first and second shells are manufactured from a polymer material.

Typically, both first and second shells comprise a teardrop oval shape.

In one example, the guitar suspension arrangement comprises at least one body strap for securing a body of the guitar away from a side of the receptacle, and at least one neck strap configured to operatively secure a neck of the guitar within the receptacle.

In one example, the suspension arrangement includes a removable neck support configured to raise the neck of the guitar, when secured by the neck strap, within the receptacle.

Typically, the body and/or neck strap comprises a hook and loop fastener to allow adjustability in securing the guitar within the receptacle.

Typically, the first and/or second shells include an inner layer of padding material for operatively padding the guitar against shocks.

Typically, the receptacle comprises at least one cushioned support for cushioning the guitar within the receptacle.

Typically, the cushioned support is configured as a removable storage pouch.

Typically, the fastening means comprises a zip fastener or clasp locker arranged around a portion of a periphery of the shells to facilitate elastic deformation of at least one shell to sandwich the guitar within the receptacle.

Typically, the first and second shells are fast with each other along a portion of the side of the receptacle via a hinge arrangement.

Typically, the first and/or second shells include outer connection points for operatively receiving a carrying strap.

Typically, first and/or second shells include a carrying handle to facilitate carrying of the guitar case.

BRIEF DESCRIPTION OF THE DRAWINGS

The description will be made with reference to the accompanying drawings in which.

DETAILED DESCRIPTION

Figure 1:
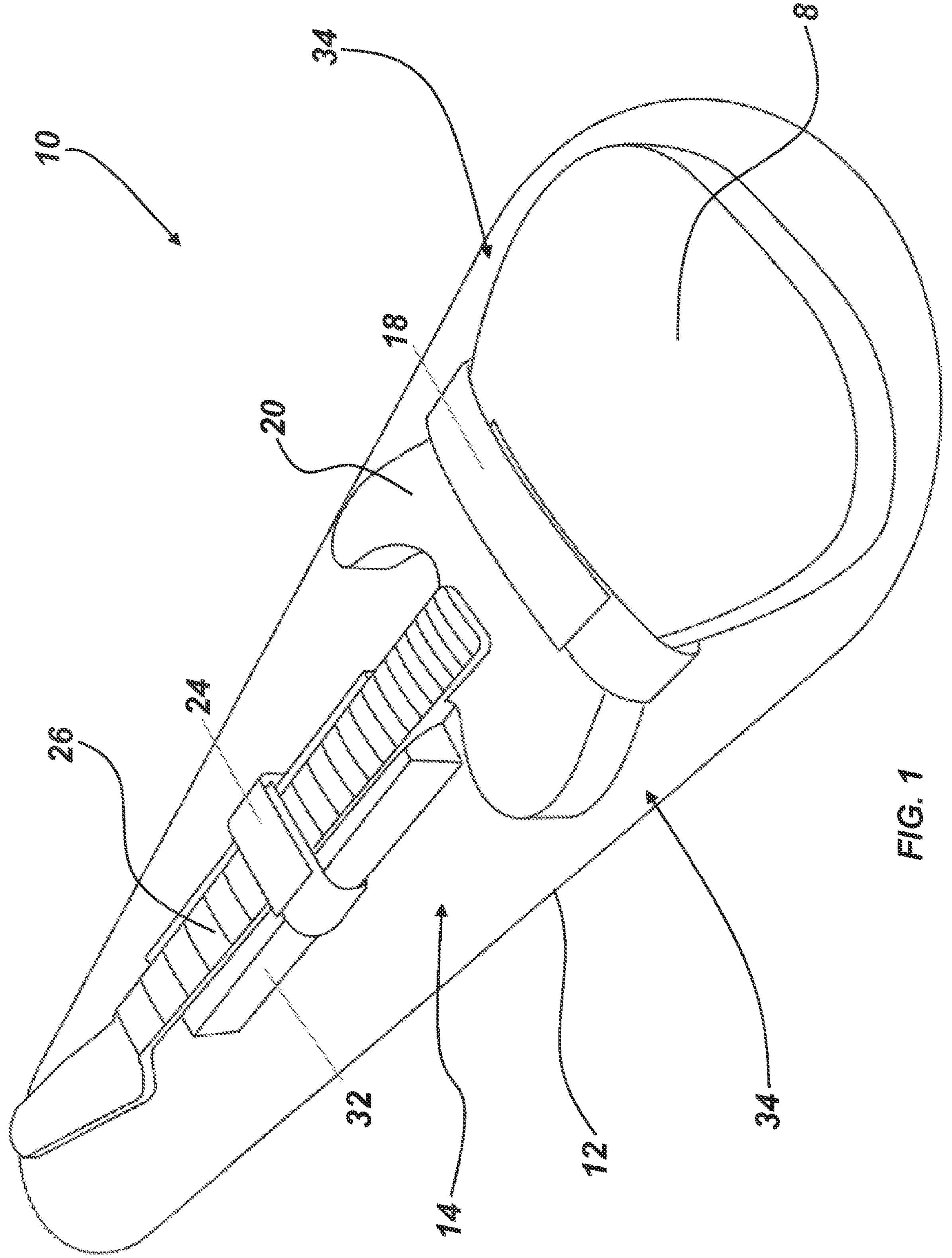
FIG. 1 is a diagrammatic perspective view representation of a first shell of a guitar case, in accordance with an aspect of the present disclosure.
Figure 2:
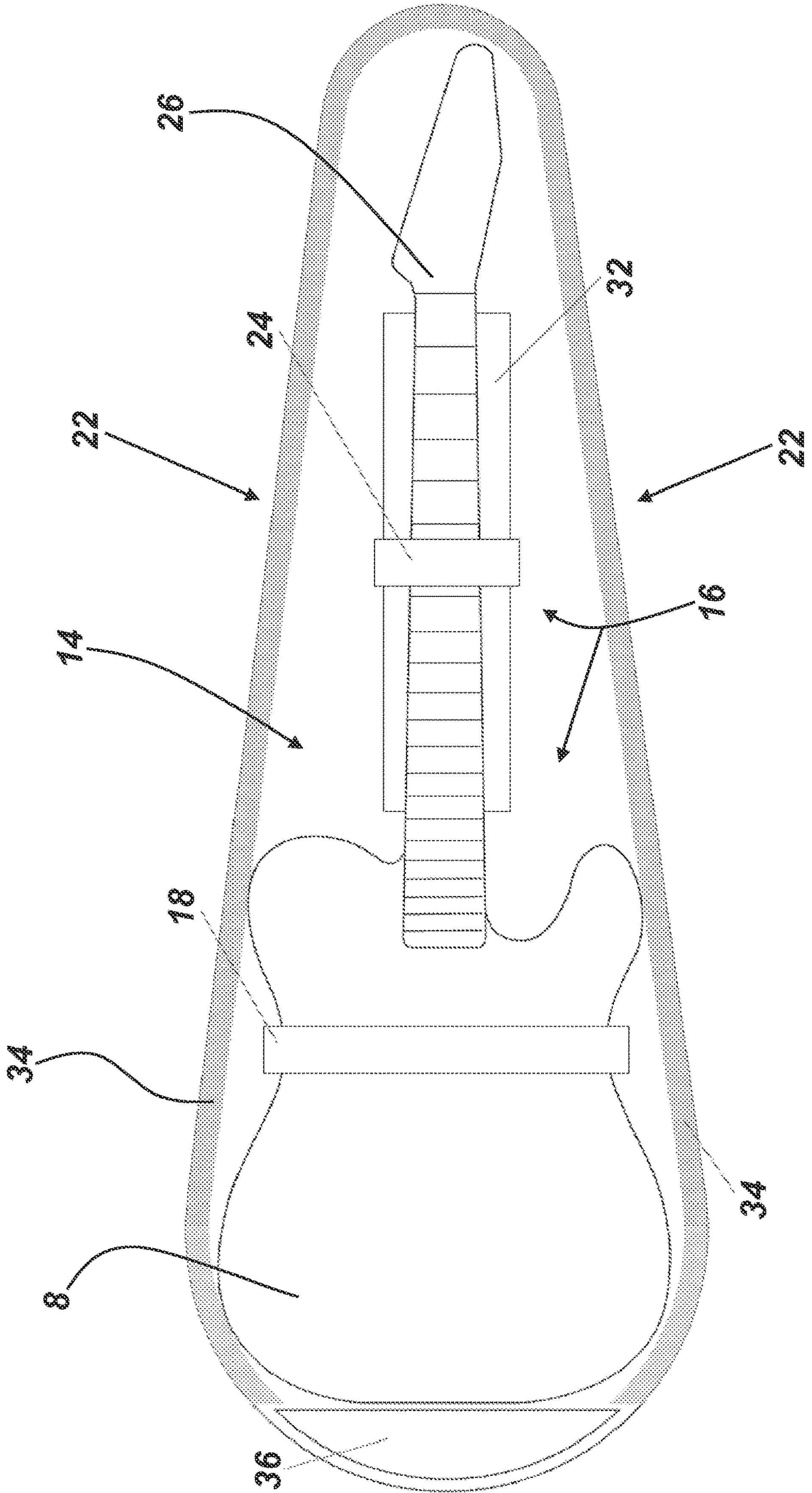
FIG. 2 is a diagrammatic top view representation of a further embodiment of the guitar case of FIG. 1.

Further features of the present disclosure are more fully described in the following description of several non-limiting embodiments thereof. This description is included solely for the purposes of exemplifying the present disclosure to the skilled addressee. It should not be understood as a restriction on the broad summary, disclosure or description of the disclosure as set out above. In the figures, incorporated to illustrate features of the example embodiment or embodiments, like reference numerals are used to identify like parts throughout.

With reference now to the accompanying drawings, there is shown broad examples of embodiments of a guitar case 10 in accordance with aspects of the present disclosure. Broadly, the guitar case 10 comprises a resiliently flexible first shell 12 having a guitar suspension arrangement 16 defining a guitar receptacle 14 for receiving a guitar 8, the guitar suspension arrangement 16 comprising body and neck straps 18 and 24 configured to secure the guitar 8 within the receptacle such that a buffer zone 34 is defined about the guitar 8. Guitar case 10 also includes a resiliently flexible second shell 28 configured to complementarily engage the first shell 12 in a clamshell manner, along with fastening means configured to fasten the shells 12 and 28 together such that at least one shell 12 and/or 28 elastically deforms over the receptacle 14 to sandwich the guitar 8 suspended within the buffer zone 34 of the receptacle 14 between the shells 12 and 28.

Importantly, a Young's modulus for a material comprising the first and second shells is selected such that elastic deformation of the shells due to external compressive loads on the guitar case 10 extends only into the buffer zone 34 without reaching the guitar 8.

In one example, the guitar case 10 comprises a resiliently flexible first teardrop oval shell 12, which defines a guitar receptacle 14 for operatively receiving a guitar 8 therein. The first shell 12 generally includes the guitar suspension arrangement 16, which comprises a body strap 18 configured to operatively secure a body 20 of the guitar 8 away from the sides 22 of the receptacle 14, as well as a neck strap 24, which is configured to operatively secure a neck 26 of the guitar 8 within the receptacle 14, as shown.

The skilled addressee is to appreciate that the suspension arrangement 16 is typically configured to securely hold and suspend the guitar 8 such that the guitar 8 is away from the sides 22 of the case 10. This provides the buffer a crumple zone 34 should the case 10 be dropped or something should impact it, e.g., external compressive loads.

Guitar case 10 also includes a resiliently flexible second teardrop oval shell 28, which is configured to operatively complementarily engage the first shell 12 in a clamshell manner. Typically, the first and second shells 12 and 28 are fastened with each other along a portion of the side 22 of the receptacle via a suitable hinge arrangement (not shown), such as a fabric hinge, or the like.

In a typical example, the shells 12 and 28 are covered by an external covering (not shown), typically of material, leather, etc. that contain the shells 12 and 28 while also functioning as suitable hinge arrangement. This external covering can be chosen to improve an aesthetic appeal of the guitar case 10 and numerous options are possible and within the scope of the present disclosure.

It is to be appreciated by the skilled addressee that the teardrop oval shape of the shells 12 and 28 typically adds to the overall sturdiness of the case 10, due to the uniform body and lack of corners, which could get caught on obstacles and could act as breaking points, i.e., force concentration points.

Guitar case 10 also generally includes some manner of fastening means (not shown) configured to fasten the shells 12 and 28 together such that at least the upper shell 12 elastically deforms over the guitar receptacle 14 in order to sandwich the guitar 8 suspended within the receptacle 14 between the shells 12 and 28. Typically, the fastening means comprises a zip or slide fastener or clasp locker arranged around a portion of the side 22 of the receptacle 14, but other variations are possible and within the scope of the present disclosure, e.g., straps, buckles, etc.

The first and second shells are typically manufactured from a polymer material, such as injection-molded plastics, but other options are entirely possible and anticipated. The first and/or second shells 12 and 28 may further include an inner layer of padding material within buffer zone 34 for operatively padding the guitar 8 against shocks and to improve protection against elastic deformation of the shells 12 and 28 due to external compressive loads.

In the present example, the suspension arrangement 16 includes a removable neck support 32, which is configured to raise the neck 26 of the guitar 8, when secured by the neck strap 24, within the receptacle 14. The skilled addressee will appreciate that use of the neck support 32 may not be appropriate for all guitars and can vary in height according to a type of guitar stored within the case 10.

In the exemplified embodiments, the body and neck strap 18 and 24 comprise a hook and loop fastener to allow adjustability in securing the guitar 8 within the receptacle 14. However, variations hereon are possible and within the scope of the present disclosure.

The receptacle 14 typically comprises at least one cushioned support 36 for cushioning the guitar 8 within the receptacle 14. Such cushioned support 36 can be positioned anywhere in the receptacle 14 where cushioning is required. In one example, the cushioned support 36 is further configured as a removable storage pouch 38, or the like.

The first and/or second shells 12 and 28 generally include outer connection points (not shown), such as D-rings or the like, for operatively receiving a carrying strap, as is known in the art. Typically, first and/or second shells 12 and 28 include a carrying handle 44 to facilitate carrying of the guitar case 10.

It is particularly advantageous that the present disclosure provides for a guitar case 10, which is able to offer good protection to a guitar 8 transported therein, while also having a more stylish design and being more easily portable than conventional guitar cases.

In particular, the suspension arrangement 16, comprising the body strap 18 and neck strap 24 hold the guitar 8 in the center of the case and away from sides 22 to provide a buffer or crumple zone 34 around the guitar 8. In case of a side impact, the shells 12 and 28 take the full force of the impact, while the guitar 8 is secure in the center.

Figure 4:
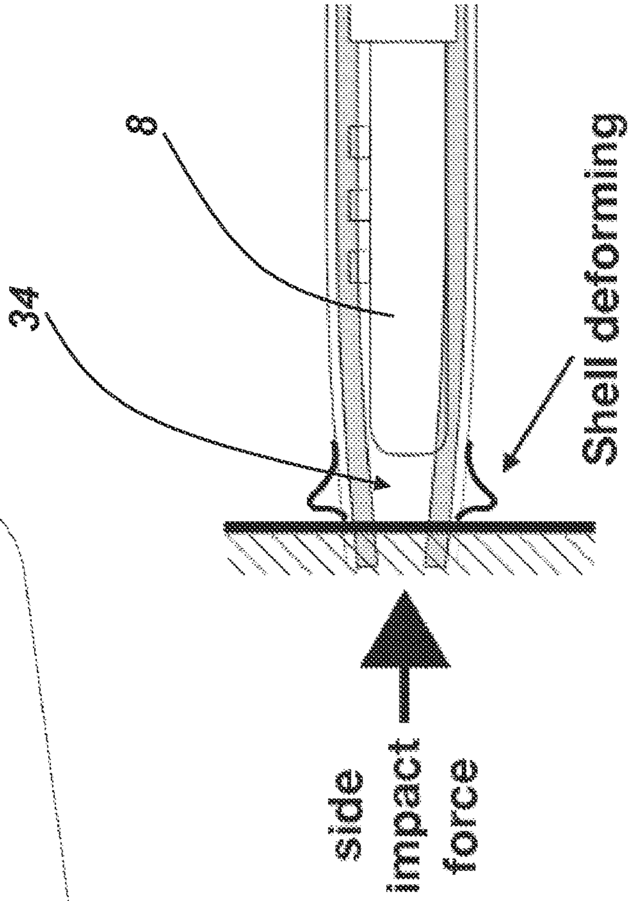
FIG. 4 is a diagrammatic representation of deformation of the resiliently flexible shells of the guitar case.
Figure 3:
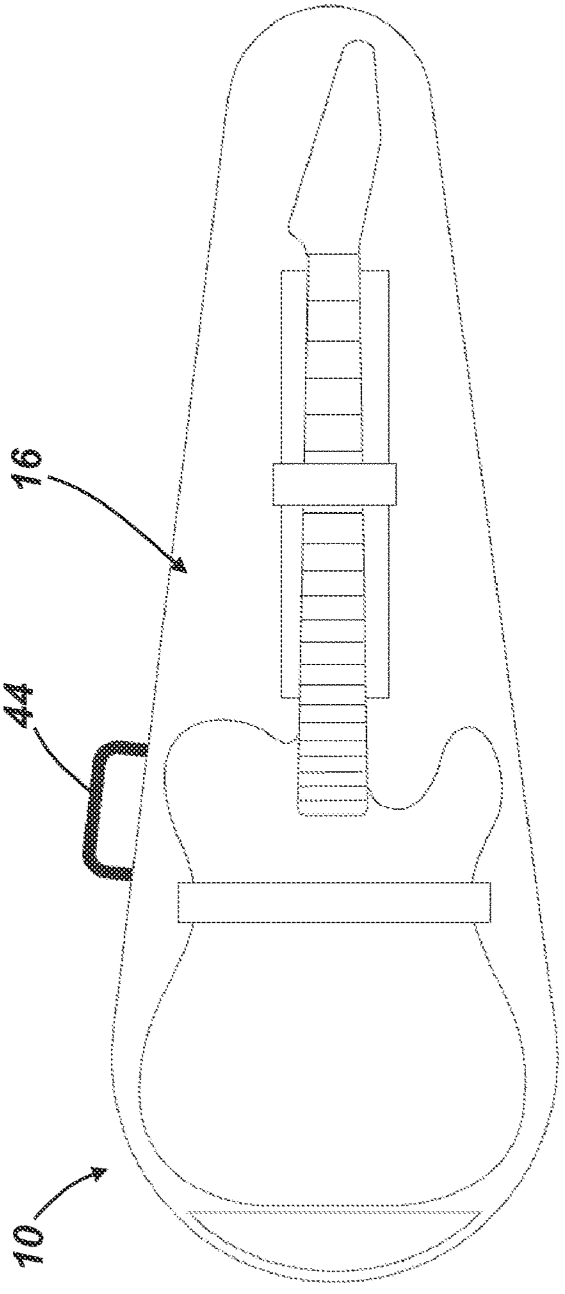
FIG. 3 is a diagrammatic top view representation of a further embodiment of the guitar case of FIG. 1.
Figure 5:
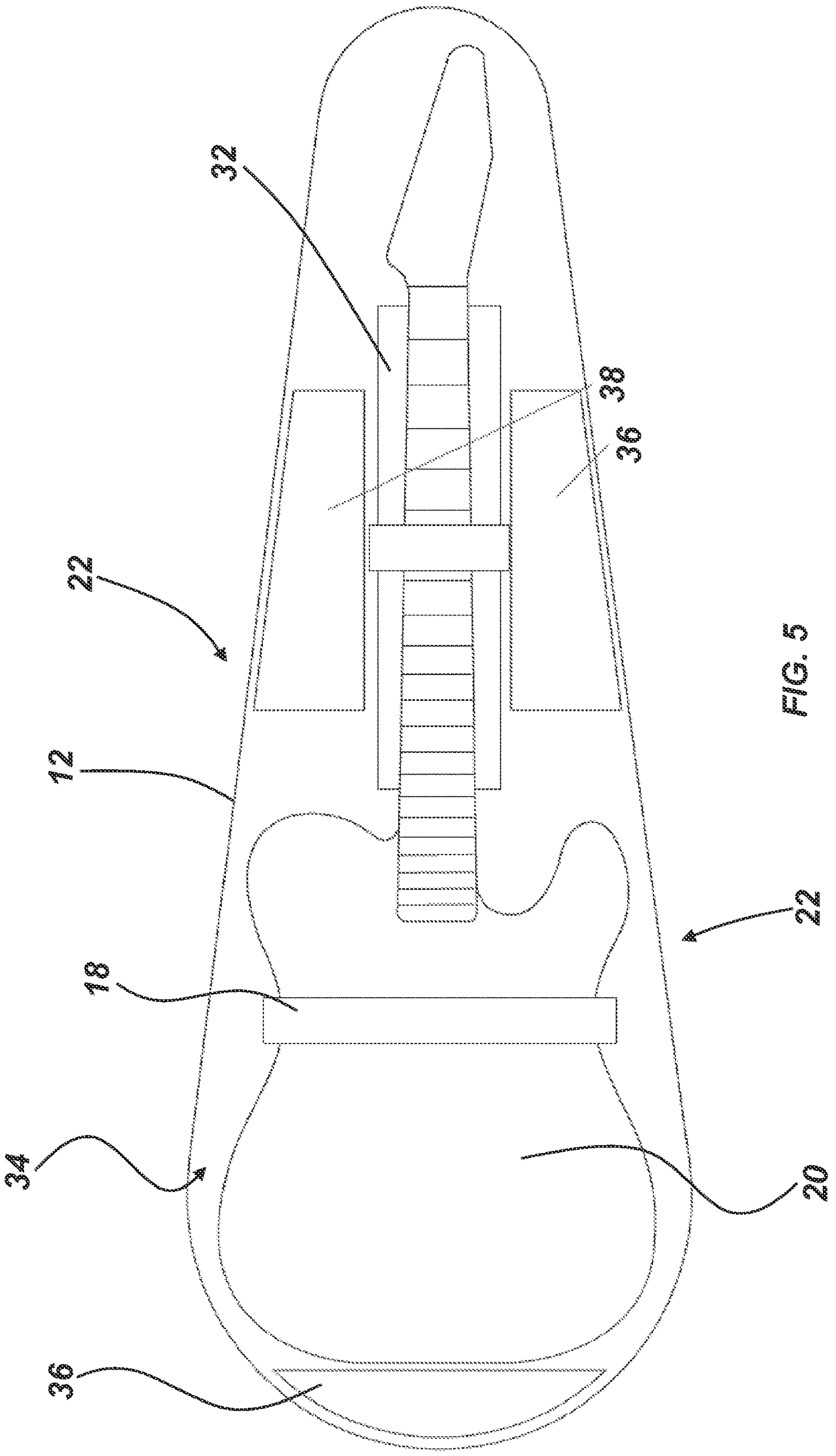
FIG. 5 is a diagrammatic top view representation of a further embodiment of the guitar case of FIG. 1.
Figure 6:
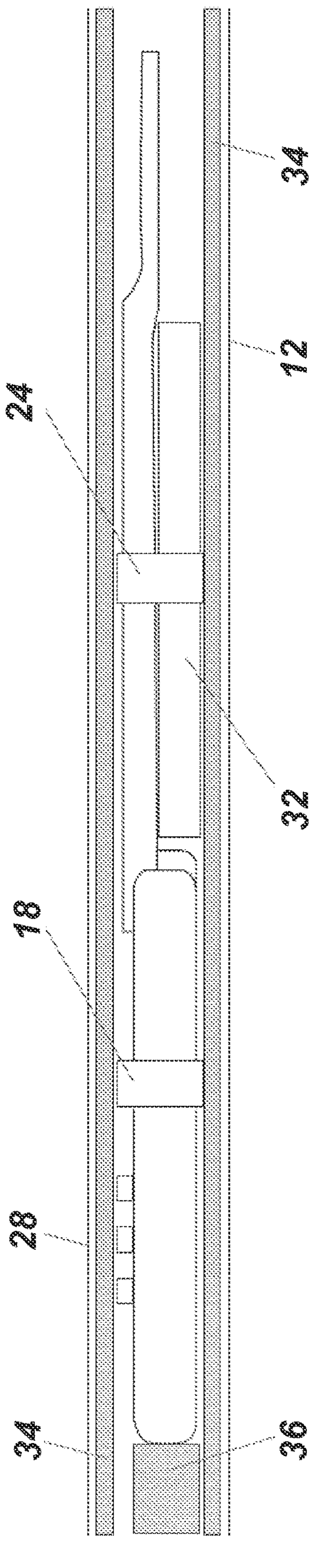
FIG. 6 is a diagrammatic side view representation of an embodiment of the guitar case of FIG. 1.
Figure 7:
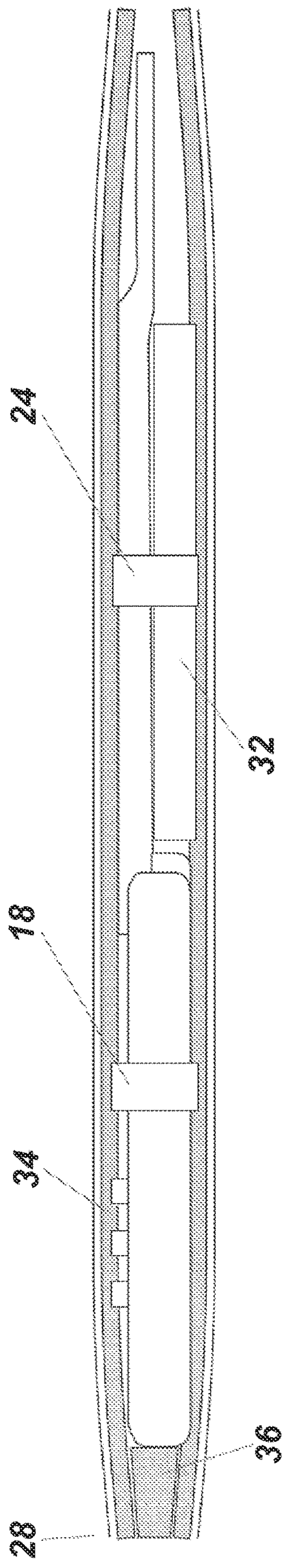
FIG. 7 is a diagrammatic side view representation of an embodiment of the guitar case of FIG. 1, showing a guitar sandwiched between the shells when the shells are fastened together.

An example hereof is shown in FIG. 4, as the shells 12 and 28 are configured to leave a buffer or crumple zone 34 around the whole of the instrument 8. When the zip is closed, the shells 12 and/or 28 bend or deform around the guitar 8 and create a "spring effect," that in case of side impact—similar to the suspension system in a car—the shells deform to take the force of the impact and leave the guitar safely suspended in the middle surrounded by the buffer zone 34. Typically, no foam protection around the guitar is needed (as used in other guitar cases or bags) as the force is absorbed by the shells themselves. The shells are also strong enough to protect the guitar from significant top impact.

Optional embodiments of the present disclosure may also be said to broadly consist in the parts, elements and features referred to or indicated herein, individually or collectively, in any or all combinations of two or more of the parts, elements or features, and wherein specific integers are mentioned herein that have known equivalents in the art to which the disclosure relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a," "an," "the," and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the disclosure, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the disclosure, while other aspects are exemplified in a different example. These examples are intended to assist the skilled person in performing the disclosure and are not intended to limit the overall scope of the disclosure in any way unless the context clearly indicates otherwise. Variations (e.g., modifications and/or enhancements) of one or more embodiments described herein might become apparent to those of ordinary skill in the art upon reading this disclosure. Skilled artisans are expected to employ such variations as appropriate, and it is intended for the claimed subject matter to be practiced other than as specifically described herein.

The invention claimed is:

1. A guitar case comprising:

a resiliently flexible first shell having a guitar suspension arrangement defining a receptacle for receiving a guitar, the guitar suspension arrangement comprising body and neck straps configured to secure the guitar within the receptacle such that a buffer zone is defined about the guitar;

a resiliently flexible second shell configured to complementarily engage the first shell in a clamshell manner; and fastening means configured to fasten the resiliently flexible first shell and the resiliently flexible second shell together, the receptacle configured such that, when the resiliently flexible first shell and the resiliently flexible second shell are fastened, the receptacle causes at least one of the resiliently flexible first shell or the resiliently flexible second shell to elastically deform and become non-planar adjacent to the fastening means to sandwich the guitar between the resiliently flexible first shell and the resiliently flexible second shell.

2. The guitar case of claim 1, wherein a Young's modulus for a material comprising the resiliently flexible first shell and the resiliently flexible second shell is selected such that elastic deformation of the resiliently flexible first shell and the resiliently flexible second shell due to external compressive loads on the guitar case extends only into the buffer zone without reaching the guitar.

3. The guitar case of claim 1, wherein the resiliently flexible first shell and the resiliently flexible second shell are each manufactured from a polymer material.

4. The guitar case of claim 1, wherein the resiliently flexible first shell and the resiliently flexible second shell both comprise a teardrop oval shape.

5. The guitar case of claim 1, wherein the body and neck straps of the guitar suspension arrangement comprise:

at least one body strap for securing a body of the guitar away from a side of the receptable; and at least one neck strap configured to operatively secure a neck of the guitar within the receptacle.

6. The guitar case of claim 5, wherein the suspension arrangement includes a removable neck support configured to raise the neck of the guitar, when secured by the at least one neck strap, within the receptacle.

7. The guitar case of claim 6, wherein one or more of the at least one body strap and the at least one neck strap comprises a hook and loop fastener to allow adjustability in securing the guitar within the receptacle.

8. The guitar case of claim 1, wherein one or more of the resiliently flexible first shell and the resiliently flexible second shell includes an inner layer of padding material for operatively padding the guitar against shocks.

9. The guitar case of claim 1, wherein the receptacle comprises at least one cushioned support for cushioning the guitar within the receptacle.

10. The guitar case of claim 9, wherein the at least one cushioned support is configured as a removable storage pouch.

11. The guitar case of claim 1, wherein the fastening means comprises a slide or zip fastener or clasp locker arranged around a portion of a periphery of each of the resiliently flexible first shell and the resiliently flexible second shell includes to facilitate elastic deformation of at least one of the resiliently flexible first shell and the resiliently flexible second shell includes to sandwich the guitar within the receptacle.

12. The guitar case of claim 11, wherein the resiliently flexible first shell and the resiliently flexible second shell includes are fastened with each other along a portion of the side of the receptacle via a hinge arrangement.

13. The guitar case of claim 1, wherein one or more of the resiliently flexible first shell and the resiliently flexible second shell includes outer connection points for operatively receiving a carrying strap.

14. The guitar case of claim 1, wherein one or more of the resiliently flexible first shell and the resiliently flexible second shell includes a carrying handle to facilitate carrying of the guitar case.

* * * * *